June 23, 1942.   R. A. GOEPFRICH   2,287,239
BRAKE
Filed Oct. 19, 1940   2 Sheets-Sheet 1

INVENTOR
RUDOLPH A. GOEPFRICH
BY M. W. McConkey
ATTORNEY

June 23, 1942. R. A. GOEPFRICH 2,287,239
BRAKE
Filed Oct. 19, 1940 2 Sheets-Sheet 2

INVENTOR
RUDOLPH A. GOEPFRICH
BY
M. W. McConkey
ATTORNEY

Patented June 23, 1942

2,287,239

UNITED STATES PATENT OFFICE 2,287,239

BRAKE

Rudolph A. Goepfrich, South Bend, Ind., assignor to Bendix Aviation Corporation, South Bend, Ind., a corporation of Delaware Application October 19, 1940, Serial No. 361,863

5 Claims. (Cl. 188—78)

The present application relates to brakes and more particularly to mechanical linkage for moving the friction part or parts of a brake into contact with a brake drum. This application is a continuation in part of my copending application Serial No. 290,547, filed August 17, 1939.

My invention is illustrated in connection with a brake for automotive vehicles, having a hydraulic service brake and a mechanical auxiliary or parking brake. The hydraulic portions of the brake are of a conventional type, but the mechanical parts of the brake are arranged in which is believed to be a novel and distinctly advantageous manner.

It is an important object of my invention to provide mechanical brake actuating linkage which will have a minimum number of component parts. This makes for simplicity, inexpensiveness and effectiveness in the brake assembly.

It will be noted that a feature of my invention is the accomplishment of all necessary and desirable functions with the use of the minimum number of parts in the brake. It is, of course, essential that each of the component parts of the brake assembly be satisfactorily supported and guided. By providing parts having carefully planned contours, I have been able to accomplish the necessary support and solidity in the assembly with the same parts which are essential for actually applying the brake.

Other objects and advantageous features of my invention will be apparent during the course of the following description, reference being had therein to the accompanying drawings, in which.

Figure 1:
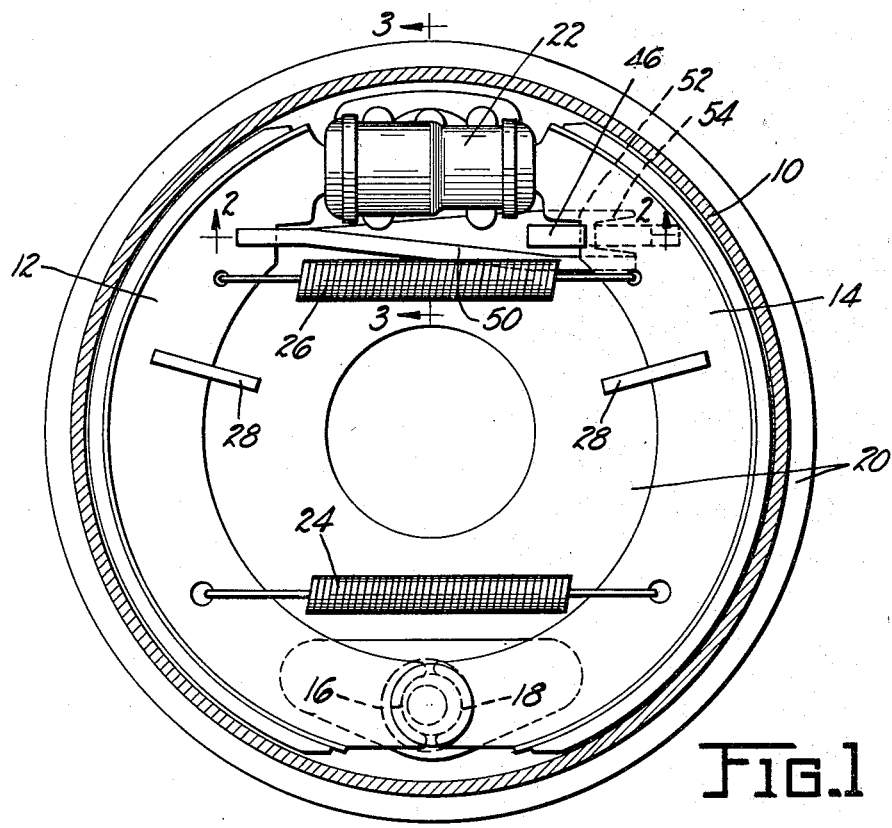
Figure 1 is a section taken through a wheel brake on a plane just inside the head of the brake drum, showing the brake shoes in side elevation.

Referring now for purposes of description to the device shown in the drawings, we find in Figure 1 a brake of a well-known and conventional type. The brake comprises a rotatable brake drum 10, a pair of brake shoes 12 and 14 anchored respectively at 16 and 18 to a stationary backing plate 20. A hydraulic wheel cylinder 22 is secured to the backing plate adjacent the unanchored ends of the brake shoes and serves as applying means for the service brake of the vehicle. A pair of return springs 24 and 26 are provided extending across the brake assembly and connecting the brake shoes 14 and 16 to return the shoes to released position whenever brake applying pressure has been released. A pair of shoe stabilizers 28 are provided for preventing undue lateral movement of the shoes.

The particular mechanical or auxiliary brake applying linkage which I have developed will now be described. A Bowden-type control comprising a conduit 30 and a cable 32 is used in actuating the mechanical linkage. The end of the conduit abuts a bracket 34. The cable 32 is connected, as by a member 36, to a lever 38, the cable extending between forks in the outward end of the lever 38, and the member 36 being prevented from slipping off the lever 38 by an extension 40 on the forks of the said lever. A spring 42 normally holds the lever 38 in brake release position, i. e., prevents movement of the outer end of lever 38 in the direction of the bracket 34. The lever 38 extends through a slot 44 in the backing plate and the inward end 46 of the lever 38 contacts at 48 the web of the shoe 14. A thrust link 50 extends from the shoe 12 to the lever 38, meeting the said lever at a point between the surface 48 and the connection of the lever 38 to the cable 32.

When the auxiliary or mechanical brake is applied the cable 32 is moved to the left (see Figure 2), moving with it the outer end of lever 38. The force thus applied to the lever 38 has a toggle action in spreading the shoes 12 and 14, force being exerted on shoe 12 through the thrust link 50 and on shoe 14 by the inward end of lever 38. The action of the lever 38 in applying the brake may also be explained as follows. Under the influence of the force applied in moving the conduit 32 to the left, the lever 38 may be considered as fulcruming on one end of the link 50 to move the shoe 14 against the brake drum, and as fulcruming on the shoe 14 to move the link 50 to the left, applying the shoe 12 to the brake drum.

Figures 3, 5:
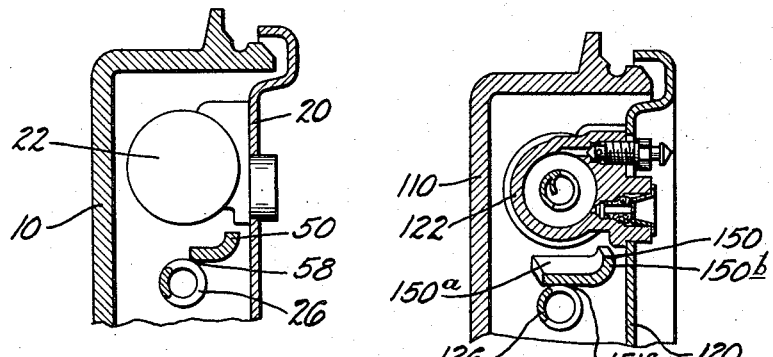
Figure 3 is a section taken on the line 3—3 of Figure 1.
Figure 5 is a section taken on the line 5—5 of Figure 4.

It will be obvious that I have provided an auxiliary brake having the minimum number of parts. The actual shoe spreading parts include only the lever 38 and the thrust link 50. The thrust link 50 is substantially L-shaped in cross section and has a flat surface 52 adjacent the slot 44 in the backing plate. Thus the surface 52 of the thrust link 50 serves to cover the opening in the backing plate and prevent the entry of dust and other extraneous matter to the interior of the brake. The slot 44 serves as a guide for the lever 38 preventing movement of the lever in a vertical direction. The lever is supported at its outer end by the conduit 32 and at its intermediate portion by the thrust link 50. It will be apparent that the thrust link 50 is slotted at 54 to allow the lever 38 to extend into the said slot, the lever and thrust link thus providing mutual support at the point where they contact one another. The thrust link 50 is notched at 56 to receive the web of shoe 12. Referring particularly to Figure 3, it is apparent that the link 50 contacts at 58 the upper return spring 26, the spring thus serving as a support for the link and preventing movement of the link in a radial direction toward the center of the brake.

Figure 4:
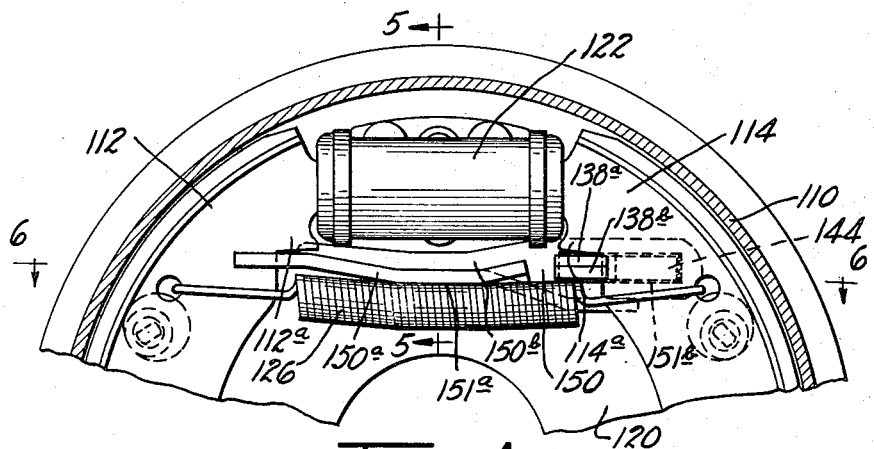
Figure 4 is a partial section taken through a brake assembly, showing a modification of the device of Figure 1.
Figure 6:
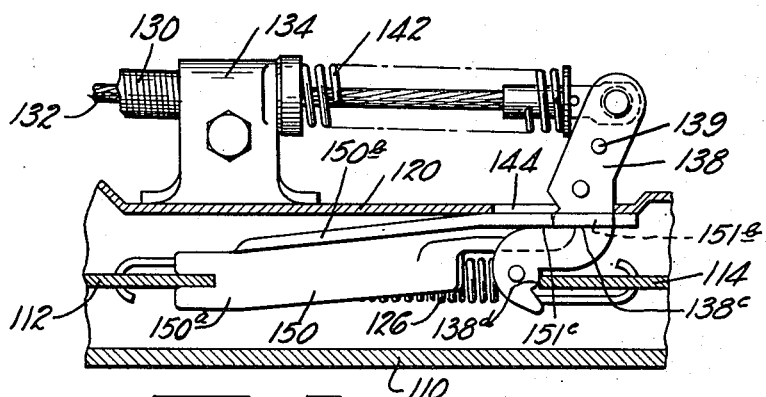
Figure 6 is a section taken on the line 6—6 of Figure 4.

Figures 4 to 6 show a modification of the device of Figure 1. Since the modification is in many respects similar to the original device, I have indicated the parts shown in Figures 4 to 6 with the same numerals used in Figures 1 to 3 plus 100 in each instance. The lever 138 comprises a pair of metal pieces 138a and 138b, riveted at points 139, and spread apart at their outer ends to accommodate the cable 132. The thrust link 150 is L-shaped in cross section through most of its length. It has a substantially horizontal flange 150a and a substantially vertical flange 150b. The horizontal flange is notched at one end to receive the web of the shoe 112, and has a wide central portion 151a which rests on the spring 126. Adjacent the shoe 114 the horizontal portion of the thrust link 150 narrows and curves downwardly to avoid contacting the web of shoe 114. The vertical flange 150b of the thrust link 150 has at one end thereof (the end adjacent the shoe 114) a slot 151b, through which extends the lever 138. Adjacent the slot 151b the vertical flange of the thrust link 150 is widened substantially to cover the opening 144 in the backing plate. In this modification the lever 138 extends through the opening in the thrust link 150, rather than into a notch at the end of the thrust link. The lever 138 is guided and supported partially by its connection with the cable 132, partially by the sides of the slot 144, and partially by the sides of the slot 151b in the thrust link 150. The thrust link 150 is held against lateral movement by its notched connection with the web of the shoe 112 and by its vertical flange which bears at 151c against the surface 138c of the lever 138. The spring 126 prevents undue downward movement of the thrust link 150, while upward movement of the link and lever combination is prevented by projections 112a and 114a on the webs of the respective shoes. The surface 138d of the lever 138 rests against the web of the shoe 114, while, as pointed out above, the surface 138c of the lever 138 rests against the vertical flange of the thrust link 150. The surface 138c thus holds the vertical flange of the thrust link in contact or near contact with the backing plate, assuring adequate covering of the slot 144 by the vertical flange of the thrust link 150.

Figure 2:
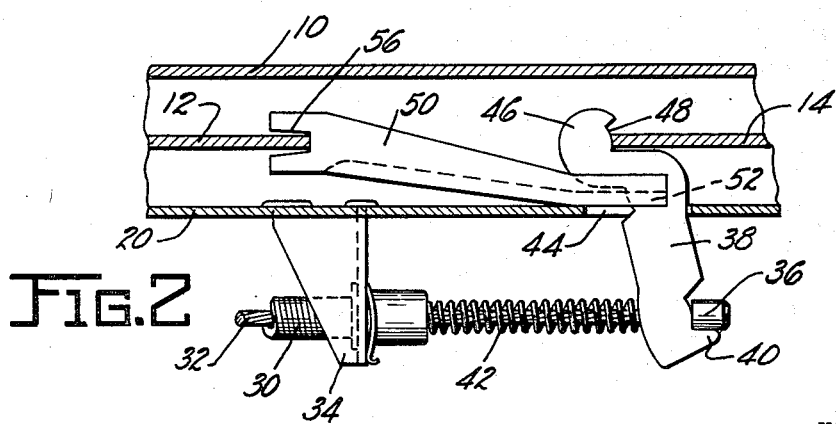
Figure 2 is a section taken on the line 2—2 of Figure 1.

The operation of the modification shown in Figures 4 to 6 is the same as the operation of the device shown in Figures 1 to 3. Movement of the cable toward the left of the figure exerts a force through the lever 138 and the thrust link 150 tending to spread the ends of the shoes to apply the brake.

While I have described two specific embodiments of my device, it is not intended that my invention shall be limited to those embodiments or shall be limited otherwise than by the terms of the appended claims.

I claim:

1. In a brake having a support member associated therewith, brake applying means comprising a lever extending through an opening in the support member, and a thrust link adapted to be moved under the influence of the said lever, the thrust link having a flange at least partially covering the opening in the support member.

2. In a brake having a backing plate, a plurality of brake shoes, and a return spring associated with the said shoes, brake applying means comprising a thrust link, and a lever extending through the backing plate for at times exerting force against said thrust link, the said thrust link having a flange which at times rests on the said spring and a flange having a slot therein through which the lever extends.

3. In a brake having a backing plate with an opening therethrough, a plurality of brake shoes, and a return spring associated with the said shoes, brake applying means comprising a thrust link, and a lever extending through the opening in the backing plate for at times exerting force against said thrust link, the said thrust link having a flange which at times rests on the said spring and a flange adjacent the backing plate and arranged to cover the opening therein.

4. In a brake having a backing plate with an opening therethrough, a plurality of brake shoes, and a return spring associated with the said shoes, brake applying means comprising a thrust link, and a lever extending through the opening in the backing plate for at times exerting force against said thrust link, the said thrust link having a flange which at times rests on the said spring and a flange adjacent the backing plate and arranged to cover the opening therein, the said lever having a portion thereof which at times contacts one of the said brake shoes.

5. In a brake having a support member with an opening therein, a plurality of friction elements, and a return spring connecting the said friction elements; brake applying means comprising a thrust link having a first flange which rests on the spring and which is slotted to receive the edge of one of the friction elements and having a second flange which at least partially covers the opening in the support member and which is slotted, and a lever which extends through the opening in the support member and through the slot in the second flange of the thrust link and contacts one of the friction elements at a point spaced from the said link flange slot through which it extends.

RUDOLPH A. GOEPFRICH.